C. M. RIDER
Scale-Beam.
No. 196,703.    Patented Oct. 30, 1877.
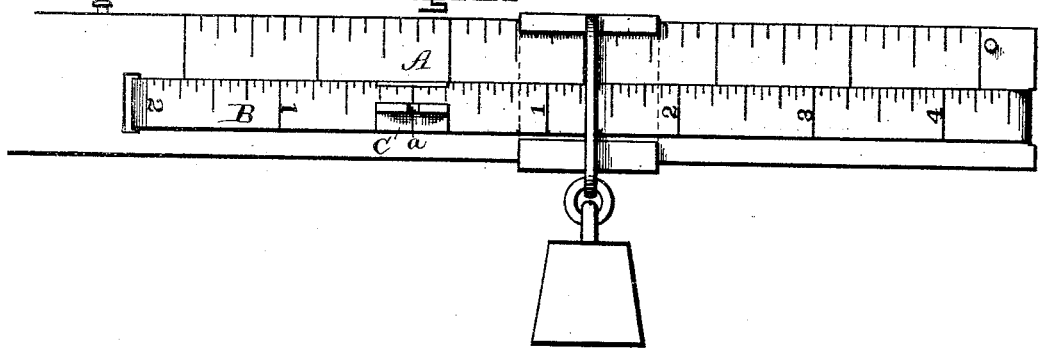
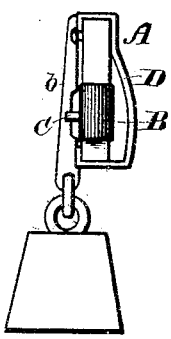
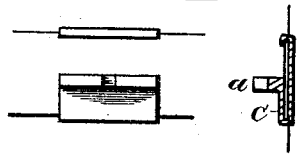
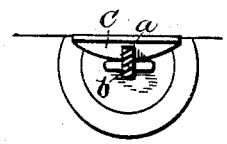
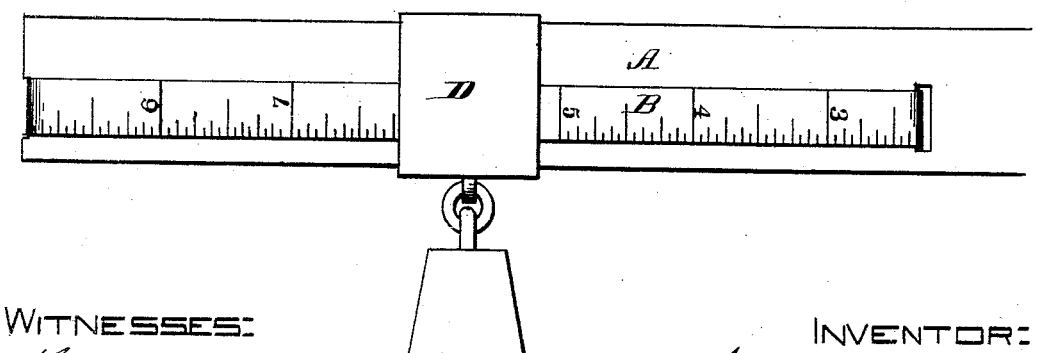
WITNESSES:
H. B. Brown
N. W. Cobb
INVENTOR:
Chas. M. Rider
PER
H. T. Abbot
ATTORNEY.

UNITED STATES PATENT OFFICE.

CHARLES M. RIDER, OF NEWARK, OHIO.

IMPROVEMENT IN SCALE-BEAMS.

Specification forming part of Letters Patent No. 196,703, dated October 30, 1877; application filed April 20, 1877.

*To all whom it may concern:*

Be it known that I, C. M. RIDER, of Newark, in the county of Licking and State of Ohio, have invented certain new and useful Improvements in Scale-Beams; and I do hereby declare that the following is a full, clear, and exact description thereof, which will enable others skilled in the art to which it appertains to make and use the same.

This invention is in the nature of an improvement in double-beam scales, whereby a vessel or other receptacle and its contents may be weighed and the weight recorded on the beam, and the contents subsequently removed and the weight of the vessel or other receptacle independently ascertained by the same scale-beam without disturbing the record of the previously-obtained weight of vessel and contents, or whereby the weight of the vessel or receptacle may be first ascertained and recorded, and after having an article or its destined contents placed therein, the weight of such article then obtained.

The invention consists in a scale-beam graduated as usual, and provided with a movable graduated tape or belt, having a catch or socket, and combined with a slide or balance weight, whereby the above-mentioned results may be had, and, in addition, the scales may be employed by others without disturbing the record of the results first obtained.

In the drawings illustrating my invention, Figure 1 is a front or face elevation of my improved scale-beam; Fig. 2, an end view of same; Fig. 3, a face view and cross-section of the tape or belt catch or socket; Fig. 4, a top view of same; Fig. 5, a rear elevation of beam.

A represents a scale-beam, graduated in any ordinary manner. An endless tape or belt, B, is secured to this beam in such a manner as—for illustration, in the manner shown in the drawings in Figs. 1 and 2—that it may be moved or adjusted longitudinally thereupon. For the purposes of adjustment this tape or belt B is provided with a fixed catch or socket, C, with which the slide D, moving upon the beam, engages. The tape may be graduated. The catch or socket C is so denominated because of its having a notch, *a*, into which a rib, *b*, of the slide D is made to extend. The slide D embraces the beam, and in such manner as to be capable of engagement with and disengagement from the catch C.

The operation is as follows: When it is desired to ascertain the weight of the contents of a vessel, package, or other receptacle, the slide is made to engage with the catch on the tape, and the tape is by it carried along until the weight is shown.

Now, the contents of the vessel, package, &c., having been removed, the empty vessel or other enveloping medium is placed upon the scales and its weight obtained by disengaging the slide from the tape and carrying the said slide backward until the weight shall have been indicated. Now, the weight of the contents is the difference between the weight of the original package and that of the empty receptacle as read between the catch on the tape and the slide as last adjusted. Without disturbing this record, other articles may be weighed by using the scale-beam.

Where an empty vessel is to be filled and weighed, the weight of the vessel is first ascertained by adjusting the tape, and the weight of the contents then obtained by disengaging the tape and slide, and moving the slide forward until the beam is balanced. The weight of the vessel being known, and the total weight also, the weight of the contents is the difference between the two, as read between the catch upon the tape and the slide.

Having thus fully described my invention, what I claim is—

1. A scale-beam provided with an adjustable weighing tape or belt adapted to ascertain the weight of the contents of a vessel or other receptacle, as between the total weight and the weight of the vessel or receptacle itself, substantially as described.

2. The combination of a movable tape or belt, a scale-beam, and an independently-operating tape-moving slide, substantially as described.

3. In a scale-beam, the combination of a movable tape or belt, a socket or catch thereon, and a slide operating independently of said tape, or in connection with said tape, substantially as described.

In testimony that I claim the foregoing as my own I affix my signature in presence of two witnesses.

C. M. RIDER.

Witnesses:
F. J. MACKENZIE,
O. G. PARR.